United States Patent
Parks

[11] 3,721,828
[45] March 20, 1973

[54] OPTICAL IMAGE SCANNER UTILIZING VARIABLE INDEX OF REFRACTION FIBER OPTICS

[75] Inventor: Jerry K. Parks, Los Altos Hills, Calif.

[73] Assignee: The United States of America as represented by the Secretary of the Army

[22] Filed: Oct. 29, 1971

[21] Appl. No.: 193,812

[52] U.S. Cl. ............................. 250/220 R, 250/227
[51] Int. Cl. ......................... G02b 5/14, H01j 39/12
[58] Field of Search ............... 250/227, 220; 350/96

[56] References Cited

UNITED STATES PATENTS 3,104,324   9/1963   Rabinow .............................. 250/227
3,636,366   1/1972   Sheldon ............................... 250/227

Primary Examiner—James W. Lawrence
Assistant Examiner—T. N. Grigsby
Attorney—Charles K. Wright et al.

[57] ABSTRACT

An array of the fiber optics are used to collimate divergent rays emanating from an image to be scanned. Scanning is then implemented by moveable mirrors located in the collimated beam region presented by the fiber optics. A linear array of detectors is arranged to sense the collimated rays as they pass by due to movement of the mirror.

2 Claims, 3 Drawing Figures

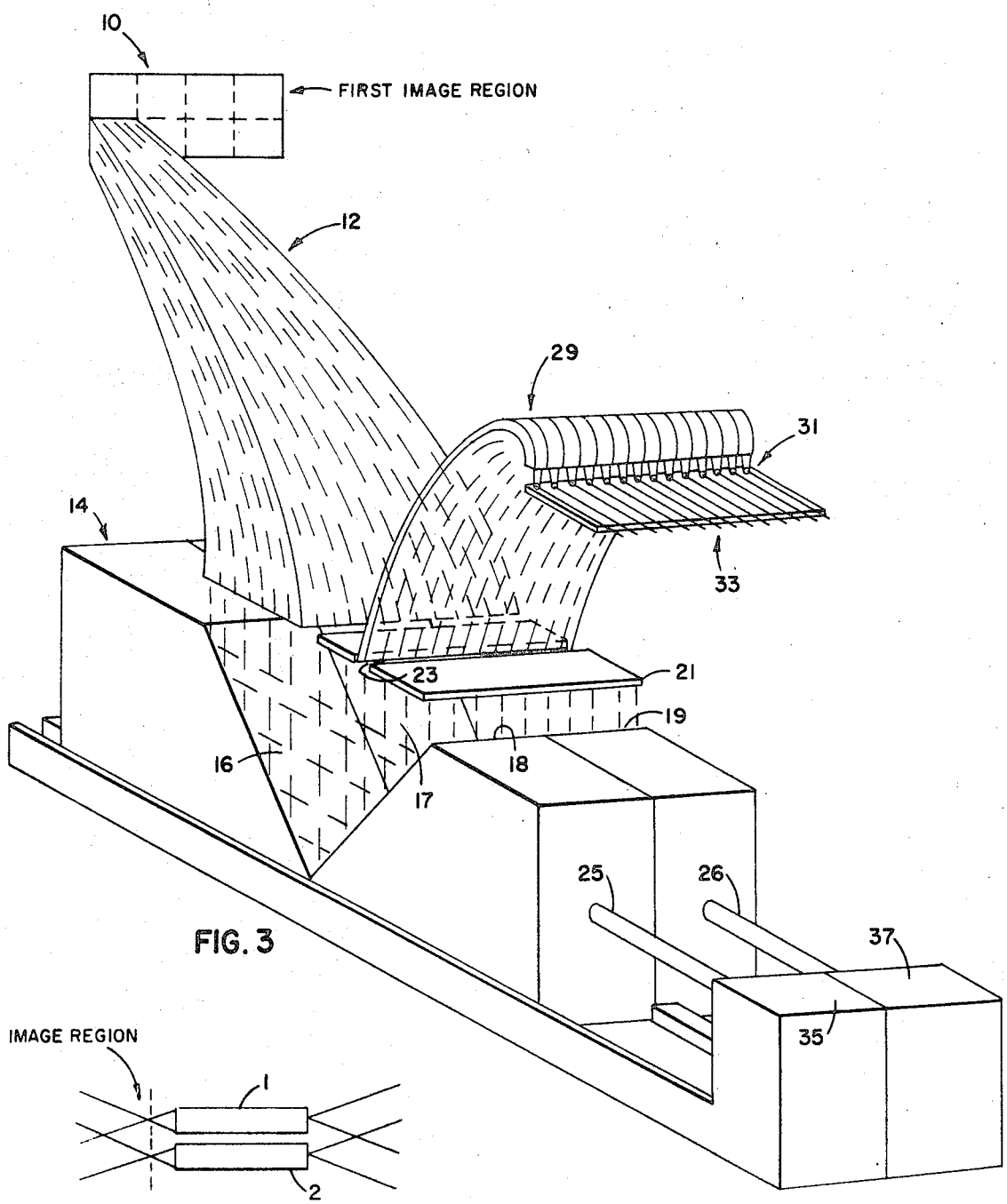

OPTICAL IMAGE SCANNER UTILIZING VARIABLE INDEX OF REFRACTION FIBER OPTICS

BACKGROUND OF THE INVENTION

This invention is related to the field of optical scanners. In order to provide a scanning system prior devices required the mechanical rotation of the complete optical system. Also movement of the detectors with respect to the fixed image was required. This required a large size and weight to the previous scanners.

SUMMARY OF THE INVENTION

An optical fiber which has an index of refraction that decreases with its radius is used to collimated light that enters into one end. An array of these fibers are bunched together to collimate divergent rays emanating from an image to be scanned. This image is reflected by a pair of moveable mirrors through a plate having a narrow slit in which a further plurality of fiber optics are located. These fiber optics send the collimated rays to a linear array of detectors. By movement of the mirrors the image will be scanned line by line by the linear array of detectors. A plurality of mirrors and a plurality of bundles of fiber optics may be used so as to sectionalize the scanning of an image.

BRIEF DESCRIPTION OF THE DRAWINGS

FIG. 1 is a showing of conventional fiber optics and the passing of light rays therethrough;

FIG. 2 is a showing of variable index of refraction fiber optics and the passing of a light ray therethrough; and FIG. 3 is a showing of a preferred embodiment of the invention.

DESCRIPTION OF THE PREFERRED EMBODIMENT

The problem of internally scanning an image formed by a large diameter optical sensor, across one or more rows of fixed detectors is accomplished by this invention. FIG. 1 shows the propagation of light down a conventional pair of fibers 1 and 2. An array of such fibers can be used to transfer an image from one point to another, but cannot be used to collimate rays emanating from image points. The angle of the ray cones at the output of this conventional fiber is never less than the angle of the input ray cones. This is because light propagates down the conventional fiber by undergoing a series of internal reflections.

A self-focusing optical fiber is shown in FIG. 2. The pair of fibers 3 and 4 have an index of refraction that decreases with their radius. Light rays propagate in this fiber along smoothly varying paths as indicated in FIG. 2. Because of the refracted index gradient in the fiber, light waves fronts travel at higher velocities near the surface of the fiber than they do near the axis. The result is that rays traveling down the fiber take smoothly varying (sinasoidal like) paths that periodically cross and recross the fiber axis. The phase of the light wave in this variable index of refraction fiber is preserved during propagation. This is because the velocity of the rays taking the longer paths is higher, due to the lower index of refraction, and this increase in velocity is just sufficient to make up for the longer propagation paths. As a consequence of this phase preservation, the fiber can be cut to lengths such that the output rays diverge, converge or are collimated. Each fiber thus behaves like a miniature lens. This type of focusing cannot be accomplished with a conventional fiber because light rays take only discrete directions of propagations determined by internal reflections from the fiber surface. An array of such fibers can be used to collimate divergent rays emanating from an image region. Scanning can then be implemented by mirrors located in the collimated beam region as shown in the example of FIG. 3. For a full description of the variable index of refraction fiber see Microwaves, Jan. 1969, page 67.

FIG. 3 shows an image plane 10 which may be produced by any of the known optical systems. A bundle of fiber optics of the self-focusing type mentioned above transfers a selected portion of the image to a scanning mirror device 14. The other sections of the image 10 will be transfered to other scanning mirrors not shown by other bundles of fiber optics also not shown. The bundle of variable index fiber optics is cut so that it will collimate the light emanating from the section of the image 10 and present it to one surface of the wedge type mirror. Mirrors 16 and 17 present a 45° angle to the collimated light presented by the fiber optics 12. The light energy therefrom is reflected from mirrors 16 and 17 to mirrors 18 and 19 which are located at 90° to the mirrors 16 and 17 so as to reflect the collimated light to a plate 21 having a slit 23 therein. Plate 23 is fixed firmly into one position by means not shown. Mirrors 16-19 are caused to move by means of rods 25 and 26 so as to cause the image to traverse to slit 23. A further set of fiber optics 29 which may be of the self-focusing type or may be of the conventional type are connected along the slit 23 so as to direct the rays therefrom to a linear array of detectors 31. Detectors 31 could be any of the well known light sensitive detectors such as photocells. Wires 33 are connected to sensing instruments not shown so as to record the information obtained by detectors 31.

In FIG. 3 the fiber optics 12 are shown tapered so as to present a larger image section to the scanning mirrors than the image detected from image 10. In this way the scanning device can obtain greater accuracy. When light from image 10 enters fiber optics 12 it is collimated by the fiber optics as the fiber optic is cut along the section where the light exiting will be parallel rays. These rays are reflected from the mirrors 16 and 17 to mirrors 18 and 19 and in turn to the stationary plate 21. Only one line of the image will enter to fiber optics 29 by way of slit 23. In this way the linear array of detectors 31 will sense one line at a time of the section of image 10. Half of the selected image 10 can be scanned by moving only rod 25 and leaving rod 26 still. The same can be accomplished by moving rod 26 and leaving rod 25 still. Any of the conventional type motors 39 and 37 can be used to move rods 25 and 26, and these motors may be tied in with the equipment which interpretes the information from the array of detectors 31.

I claim:

1. In a system whereby an image is to be scanned the improvement comprises a plurality of optical fibers having one end positioned to the image so as to propagate rays from the image through its length; said optical fibers each collimating the rays entering therein; said plurality of fibers having its other end directed to a scanning device whereby the image may be scanned; said optical fibers have a variable index of refraction with respect to their radius; a linear array of detectors; said scanning device comprising a mirror which reflects the image emitted from the optical fibers to said linear array of detectors; and said mirror means being moveable so as to cause said linear array of detectors to scan the image presented by the optical fibers.

2. A system as set forth in claim 1 wherein said scanning system further comprises a plate having a slit therein; a further set of optical fibers having one end arranged along said slit and their other ends arranged along said linear array of detectors; said mirror being moveable so as to cause said image to move across said plate whereby said further set of optical fibers will present line scanned information to said linear array of detectors.

* * * * *